United States Patent
Miyasaka

[11] 3,744,334
[45] July 10, 1973

[54] NON-INTERFERING WATCH-CROWN GEAR AND PINION GEAR AND METHOD OF MANUFACTURE

[75] Inventor: Mamoru Miyasaka, Nagano-ken, Japan

[73] Assignee: Kabushiki Kaisha Suwa Seikosha, Tokyo, Japan

[22] Filed: Nov. 16, 1971

[21] Appl. No.: 199,163

[30] Foreign Application Priority Data
Nov. 18, 1970 Japan.............................. 45/113868

[52] U.S. Cl. ............................................... 74/462
[51] Int. Cl............................................. F16h 55/06
[58] Field of Search........................................ 74/462

[56] References Cited
UNITED STATES PATENTS
| | | | |
|---|---|---|---|
| 3,345,883 | 10/1967 | Glocker................................ | 74/462 |
| 1,491,481 | 4/1924 | Huetter............................ | 74/462 X |
| 3,367,462 | 2/1968 | Bibbens............................ | 74/462 X |

*Primary Examiner* — Leonard H. Gerin
*Attorney* — Alex Friedman, Harold I. Kaplan et al.

[57] ABSTRACT

A watch-crown gear and a mating pinion gear have wedge-shaped teeth so oriented that upon moving the pinion gear to mesh with the crown gear, interference of the teeth of the pinion gear with the teeth of the crown gear cannot occur. The side faces of the crown gear teeth are so aligned that a side face on each of two teeth can be cut with a single pass of a tooth-cutter.

5 Claims, 8 Drawing Figures

Patented July 10, 1973 3,744,334

NON-INTERFERING WATCH-CROWN GEAR AND PINION GEAR AND METHOD OF MANUFACTURE

BACKGROUND OF THE INVENTION

In a gear train in a watch wherein it is necessary to mesh a pinion gear with a crown gear for the purpose of setting the time indication, it may happen that a tooth on the pinion gear may come into opposition with a tooth on the crown gear. If the pinion gear is moved with substantial force, damage to either or both gears may well result. Consequently, it is desirable that provision be made for ensuring that pinion gear teeth will come into opposition with spaces between the crown gear teeth when the gears are mated.

SUMMARY OF THE INVENTION

Interference between the teeth of a pinion gear and the teeth of a mating crown gear upon movement of the pinion gear in such a direction as to mesh the pinion gear with the crown gear may be eliminated by making the teeth of the crown gear wedge-shaped with the narrow edge of the wedge oriented toward the pinion gear. The same objective may be achieved by making the teeth of the pinion gear wedge-shaped with the narrow edge of the pinion gear teeth oriented toward the crown gear. Desirably, the teeth of both the crown gear and the pinion gear may be wedge-shaped with the narrow edges of the teeth of one gear oriented toward the other gear.

To cut the teeth of the crown gear in accordance with the invention, a tooth-cutter is moved in a chordal direction which is perpendicular to the axis of the crown gear. In this method of cutting the crown gear teeth the cutter travels completely across the gear so that a single face on each of two teeth is cut in one pass across the gear, and these two faces are aligned with each other.

Accordingly, it is an object of the present invention to provide a crown gear and pinion gear combination in a time-setting gear train in which interference between the teeth of the two gears upon moving the pinion gear into meshing position is substantially eliminated.

Another object of the invention is to provide a crown gear having wedge-shaped gear teeth for the purpose of avoiding interference between gear teeth when a pinion gear is moved into meshing position with the crown gear.

A further object of the invention is to provide a pinion gear having wedge-shaped teeth for the purpose of avoiding interference between gear teeth when the pinion gear is moved into meshing position with a crown gear.

Yet a further object of the invention is to provide a pinion gear and a crown gear both having wedge-shaped teeth with the narrow edges oriented toward each other for the purpose of avoiding interference when the pinion gear is moved into meshing position with the crown gear.

Still another object of the invention is to provide a method of cutting crown gear teeth so that said teeth are wedge-shaped.

Yet another object of the invention is to provide a method of cutting wedge-shaped teeth in a crown gear wherein a single face on each of two teeth is cut in a single pass of a tooth-cutter and in which the two faces cut in the same pass are aligned with each other.

Still other objects and advantages of the invention will in part be obvious and will in part be apparent from the specification.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

Figure 1:
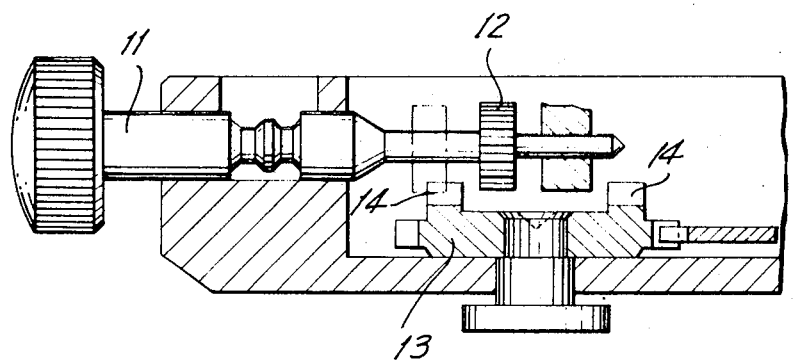
FIG. 1 is a sectional view of a watch showing a mating crown gear and pinion gear.
Figure 2:
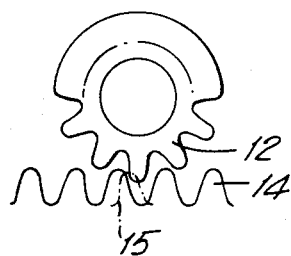
FIG. 2 is an elevational view in solid line of a pinion gear and a crown gear in meshable position, and in broken line of the same pinion gear and crown gear in interfering position.

In a watch, whether of conventional construction or in accordance with the present invention, setting of the time is accomplished by a gear-train comprising a stem 11 on which is mounted a pinion gear 12; as the stem is drawn outward, it is desired that pinion gear 12 will mate with teeth 14 of crown gear 13. Conventional pinion gear 12 is shown meshing with conventional crown gear 14 in FIG. 2. However, if the crown gear teeth are in the position indicated by broken line 15 then pinion gear 12 will be blocked by crown gear teeth 14 from achieving the mating position; if pinion gear 12 is pulled forcefully in the attempt to mate the teeth, either or both of the two gears may be damaged sufficiently so that the gear train becomes inoperative and it becomes impossible to set time.

Figure 3:
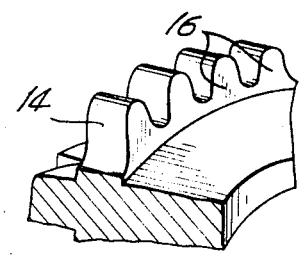
FIG. 3 is a perspective view of a conventional crown gear.
Figure 4:
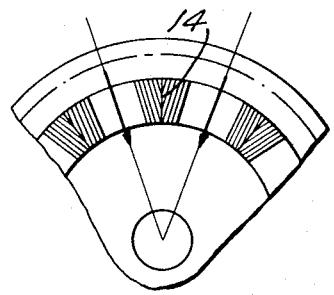
FIG. 4 is a portion of a conventional crown gear in plan.

The shape of crown gear teeth is shown in perspective in FIG. 3 where the surfaces 16 of crown gear teeth 14 are those which may block the entry of pinion gear 12 between the individual teeth 14 of the crown gear. Conventional crown gear teeth are shown in FIG. 4 where the arrows are radial with respect to the axis of the crown gear and indicate the directions in which a tooth-cutter will move in forming conventional teeth.

Figure 5:
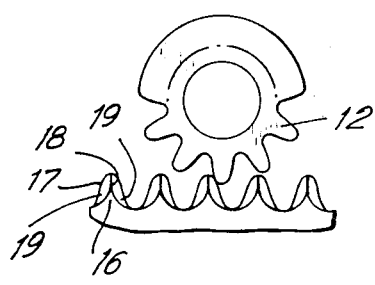
FIG. 5 is an elevational view of a portion of a crown gear in accordance with the present invention mating with a conventional pinion gear, the view being from a position near the axis of the crown gear.

To eliminate, or substantially reduce the possibility of interference between the pinion gear teeth and the crown gear teeth, crown gear teeth in accordance with the present invention are cut so that they are wedge-shaped in any horizontal cross-section. Crown gear teeth cut in this way are shown at 17 in FIGS. 5 and 7 in which interfering surface 16 has been almost completely cut away to form side surfaces 19 meeting at a narrow edge 18. It will be noted that the pinion gear 12 approaches the crown gear teeth 17 from the narrow end of the wedge, which greatly reduces the possibility of interference between the lateral surface of the teeth of the pinion gear and the crown gear teeth.

Figure 6:
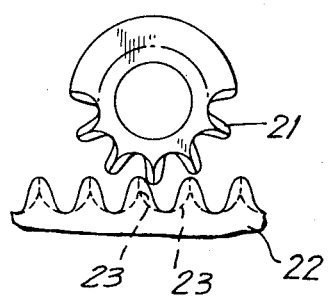
FIG. 6 is an elevational view of a crown gear and a mating pinion gear, both in accordance with the present invention, from a position near the watch crown axis.

Another embodiment of the invention is shown in FIG. 6 wherein pinion gear teeth 21 are wedge-shaped and crown gear teeth are of conventional shape. However, maximum advantage is derived when both the pinion gear teeth and the crown gear teeth are wedge-shaped with the narrow ends oriented towards each other as indicated by broken lines 23.

Figure 7:
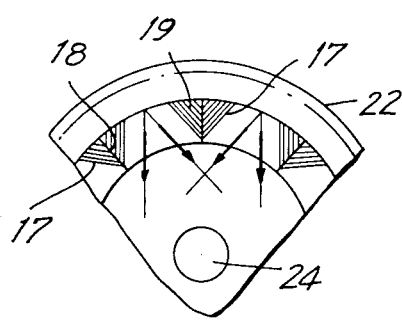
FIG. 7 is a plan view showing wedge-shaped teeth of a crown gear in accordance with the present invention and the directions in which a tooth-cutter moves in cutting the wedge-shaped teeth.
Figure 8:
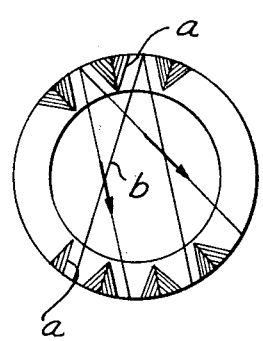
FIG. 8 is a plan view of wedge-shaped teeth of a crown gear with the paths taken by a tooth-cutter cutting a single face on each of two teeth in a single pass.

The method of cutting wedge-shaped teeth on crown gear 22 is shown in FIGS. 7 and 8 where the arrows indicate the direction in which a tooth-cutter is to pass in forming surfaces 19. As is shown in FIG. 7, the path of the tool cutter is along a chord of a circle transverse to axis 24 of crown gear 22. Consequently, a tooth-cutter cannot cut a face on each of two adjacent teeth in the same pass as is done in cutting conventional crown gear teeth. However, as is evident from FIG. 8, a tooth-cutter can cut a single face on each of two teeth at the ends of a chord in a single pass. Two faces cut in a single pass are shown at a-a made by a cutter traversing the path b. Consequently, little if any additional time is required for cutting a crown gear in accordance with the present invention over that required for cutting a conventional crown gear.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A watch crown-gear which permits interference-free meshing with a pinion upon movement of said pinion in a direction radial to and outward from the axis of said crown gear, comprising crown-gear teeth which are wedge-shaped with the narrow edge of said teeth being at the inner boundary of said teeth.

2. A watch crown-gear as defined in claim 1, wherein each side face of each of said gear teeth is so aligned with a side face of another non-adjacent gear tooth that said aligned side faces can be formed in one pass of a tooth-cutter.

3. A pinion gear which permits interference-free meshing with a crown gear upon movement of said pinion gear in a direction radial to and outward from the axis of said crown gear, comprising teeth around said pinion gear which are wedge-shaped with the narrow edge of said teeth being radial to the axis of said pinion gear and all of said wedges being oriented in one direction, the direction being parallel to the axis of said pinion gear.

4. A watch crown-gear as defined in claim 1 and a pinion gear which permits interference-free meshing with said crown gear upon movement of said pinion gear in a direction radial to and outward from the axis of said crown gear wherein said pinion gear has teeth which are wedge-shaped with the narrow edge of said teeth being radial to the axis of said pinion gear and all of said wedges being oriented in one direction, the direction being parallel to the axis of said pinion gear, and the narrow edges of said crown gear wedges and said pinion gear wedges being oriented toward each other.

5. A method of cutting wedge-shaped teeth in a crown gear comprising the step of passing a tooth-cutter in a chordal direction perpendicular to the axis of said gear so that one face is cut on each of two teeth in a single pass of said cutter.

* * * * *